(12) United States Patent
Higuchi et al.

(10) Patent No.: US 8,015,219 B2
(45) Date of Patent: Sep. 6, 2011

(54) COMPUTER SYSTEM STORAGE DEVICE AND DATE UPDATING METHOD

(75) Inventors: Takuya Higuchi, Odawara (JP); Koji Sonoda, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 12/344,688

(22) Filed: Dec. 29, 2008

(65) Prior Publication Data

US 2010/0106688 A1 Apr. 29, 2010

(30) Foreign Application Priority Data

Oct. 23, 2008 (JP) .................................. 2008-272846

(51) Int. Cl.
*G06F 17/30* (2006.01)
*G06F 7/00* (2006.01)

(52) U.S. Cl. ......... 707/812; 707/799; 707/809; 707/822

(58) Field of Classification Search .................. None
See application file for complete search history.

(56) References Cited

U.S. PATENT DOCUMENTS 6,378,059 B1 * 4/2002 Miyoshi ...................... 711/203
6,799,255 B1 * 9/2004 Blumenau et al. ........... 711/152
2005/0038850 A1 * 2/2005 Oe et al. ..................... 709/203
2005/0182799 A1 * 8/2005 Hitz et al. ................... 707/202
2007/0300034 A1 * 12/2007 Aoyama ...................... 711/170

FOREIGN PATENT DOCUMENTS

JP 2005-529410 9/2005

\* cited by examiner

*Primary Examiner* — Tony Mahmoudi
*Assistant Examiner* — James J Wilcox
(74) *Attorney, Agent, or Firm* — Antonelli, Terry, Stout & Kraus, LLP.

(57) ABSTRACT

Data stored in a plurality of snapshots that can be updated is efficiently updated.

A computer system includes a computer that provides a plurality of storage areas and a storage device that stores data read and written in the storage areas. The storage device provides a first volume that stores data shared by the storage areas respectively and a second volume that stores data held in the storage areas respectively. The computer stores storage area management information and a storing flag that shows a storing part of updated data and sets the storing flag in accordance with a request. When the computer receives the update of the data stored in the first volume and the storing flag is set to the second volume, if a second area corresponding to a first area is not allocated to the second volume, the computer updates a second area newly allocated to the second volume to store the location information of the newly allocated second area in the storage area management information correspondingly to the first area.

15 Claims, 14 Drawing Sheets

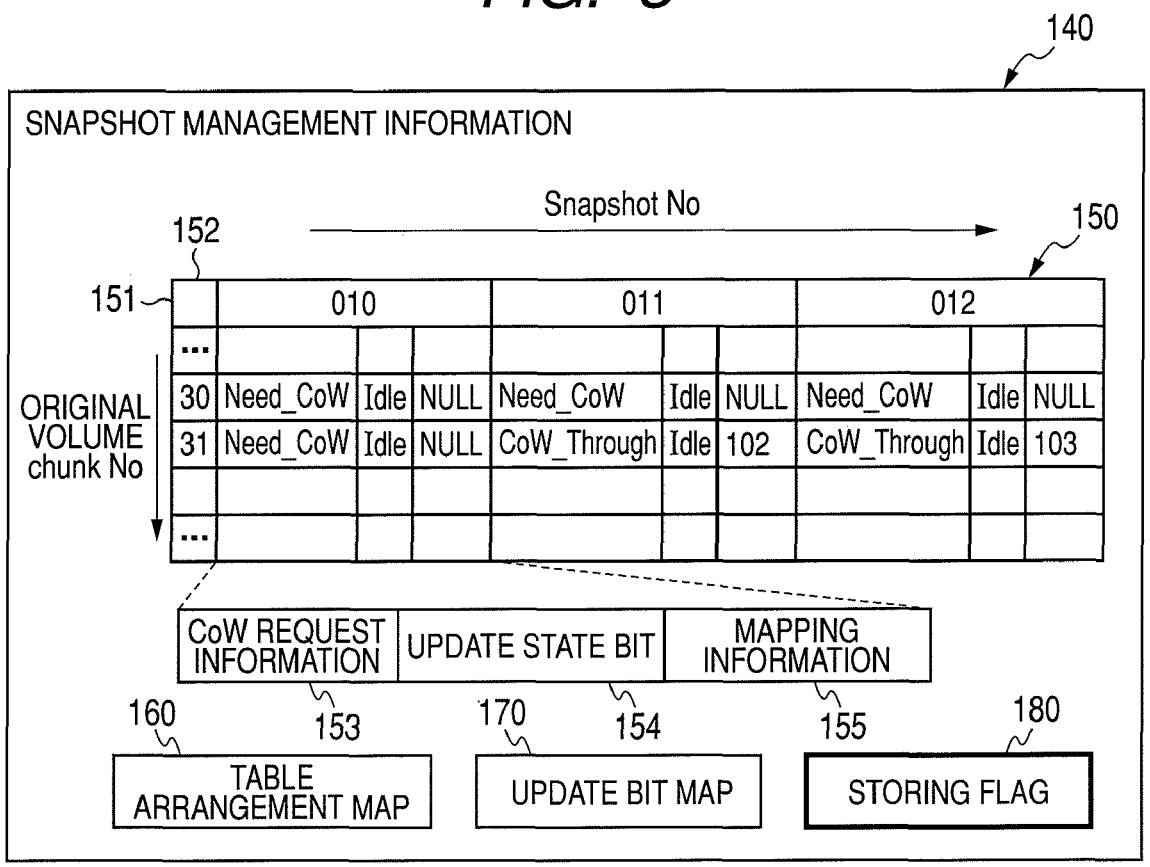

FIG. 10

| NAME OF VNAS | ORIGINAL DATA LU | DIFFERENTIAL DATA LU |
|---|---|---|
| Test 1 | | |
| Test 2 | LUN xxx | LUN yyy |
| Test 3 | | |

OK   Cancel

FIG. 11

ADDING PROCESS OF VIRTUAL NAS GROUP WAS COMPLETED.

OK

| NAME OF VNAS | ORIGINAL DATA LU | DIFFERENTIAL DATA LU |
|---|---|---|
| Test 1 | | |
| Test 2 | LUN xxx | LUN yyy |
| Test 3 | | |

OK  Cancel

COMPUTER SYSTEM STORAGE DEVICE AND DATE UPDATING METHOD

CROSS REFERENCES TO RELATED APPLICATIONS

This application relates to and claims priority from Japanese Patent Application No. 2008-272846, filed on Oct. 23, 2008, the entire disclosure of which is incorporated herein by reference.

BACKGROUND OF THE INVENTION

The present invention relates to a computer system for providing a plurality of storage areas, and more particularly to a technique that updates the storage areas together.

In order to prevent the loss of data, as one of methods for forming a backup of a volume that stores the data, a method of forming a snapshot is exemplified. The snapshot means an image of the volume at the time of forming the backup. Since the snapshot is used to recover the damage of a file system, the snapshot is ordinarily used only for reading the data.

Further, the snapshot can be greatly utilized when the data is copied without a view to obtain the backup. For instance, a case is supposed to construct a plurality of test environments. However, since the snapshot is used only for reading as described above, if test data can be updated, it is convenient to employ the test data.

JP-T-2005-529410 discloses a technique that a differential volume for storing updated data is provided as well as an original snapshot only for reading to provide a snapshot that can be updated. In the technique disclosed in the patent literature 1, when a plurality of snapshots are provided, an area of a differential volume is reserved for each of the provided snapshots to store the updated data so that the snapshots can be individually met.

As a specific example, when software is developed by three development teams, a case that the technique disclosed in the JP-T-2005-529410 is applied thereto will be described. Further, each development team carries out a development by using an originally existing program serving as a base. At this time, three duplications (snapshots) of the program (original data) as the base are formed respectively for the development teams and the one original data is respectively pointed thereby. Then, when a certain development team adds a change to the original data, changed data is stored in the differential volume by considering the changed data to be a difference so that the snapshot can be updated.

SUMMARY OF THE INVENTION

In the technique disclosed in the JP-T-2005-529410, since the difference is stored for each of the formed snapshots, that is, for each of the development teams, the data changed by a certain development team cannot be referred to by other development teams. To allow the changed contents to be reflected in other development teams, an operation carried out by the development team that changes the data needs to be carried out again to newly store the changed data in the differential volume corresponding to the development team that tries to refer to the changed data. Accordingly, in order to refer to the same changed data by all the development teams, all the development teams need to carry out the same operation.

Namely, in order to allow updated data in one snapshot to be reflected in all the snapshots, the areas of the differential volumes corresponding to all the snapshots need to be updated. Accordingly, since the number of the updated data corresponding to the number of the snapshots (the number of the development teams) needs to be stored, a required storage capacity is inconveniently increased.

The present invention is devised by considering the above-described problems, and it is an object of the present invention to allow updated contents to be efficiently reflected in all snapshots as required when a plurality of snapshots that can be updated are provided.

In a representative embodiment of the present invention, a computer system is provided that comprises: a computer that provides a plurality of storage areas (snapshots that can be updated) for reading and writing data; and a storage device that stores the data read and written in the storage areas. The computer includes: a first interface connected to the storage device; a first processor connected to the first interface; and a first memory connected to the first processor. The storage device includes: a second interface connected to the computer; a second processor connected to the second interface and a second memory connected to the second processor. The storage device provides a first volume that stores data (original data) shared by the storage areas respectively and a second volume that stores data (differential data) held in the storage areas respectively to the computer. In the first memory, are stored storage area management information (snapshot management information) that manages the storage areas respectively, and a storing flag that sets a storing part of updated data when the update of the data is received. When the first processor receives the designation of the storing part of the data, the first processor sets the storing flag in accordance with the designated storing part. When the first processor receives the update of the data stored in the first volume and the storing flag is set to the first volume, the first processor specifies a first area of the first volume as an object to be updated to update the specified first area. When the first processor receives the update of the data stored in the first volume and the storing flag is set to the second volume, the first processor decides whether or not a second area corresponding to the first area is allocated to the second volume in accordance with the storage area management information. When the second area is allocated to the second volume, the first processor updates the second area. When the second area is not allocated to the second volume, the first processor newly allocates the second area to the second volume to update the newly allocated second area. The first processor stores the location information of the newly allocated second area in the storage area management information correspondingly to the first area.

According to an embodiment of the present invention, when a plurality of storage areas (snapshots that can be updated) are provided, updated contents can be efficiently reflected in all the storage areas as required.

BRIEF DESCRIPTION OF THE DRAWINGS

FIG. 2 is a diagram showing one example of a VNAS-HLUN mapping table of the first embodiment of the present invention.

FIG. 3 is a diagram showing one example of snapshot management information of the first embodiment of the present invention.

FIG. 10 is a diagram showing one example of a virtual NAS additional group recognizing screen of the first embodiment of the present invention.

FIG. 11 is a diagram showing one example of a screen for informing about the completion of the addition of the virtual NAS group of the first embodiment of the present invention.

DESCRIPTION OF THE PREFERRED EMBODIMENTS

Figure 1:
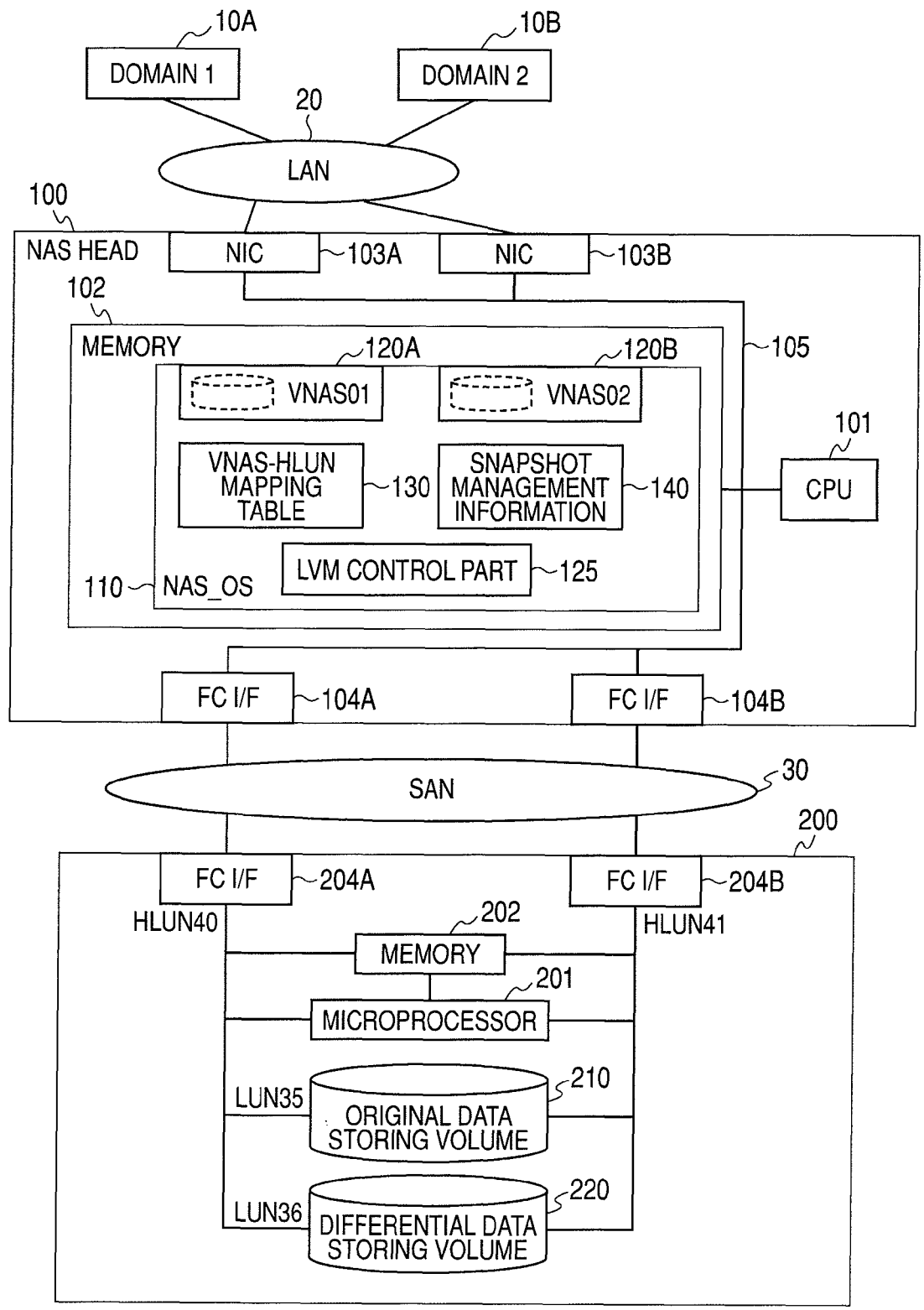
FIG. 1 is a diagram showing the structure of a computer system of a first embodiment of the present invention.

Now, referring to the drawings, an embodiment of the present invention will be described below.

First Embodiment

FIG. 1 is a diagram showing the structure of a computer system of a first embodiment of the present invention.

The computer system of the first embodiment of the present invention includes a NAS (Network Attached Storage) head 100 and a storage device 200. The NAS head 100 is connected to the storage device 200 through an SAN (Storage Area Network) 30. The SAN 30 is a network of, for instance, a fiber channel.

A NAS is a file server directly connected to a network to input and output data in accordance with a request from a domain. The NAS head 100 separates the storage device for storing the data to allow a file system and a controller to be independent of the NAS. The NAS head 100 is used so that the NAS and the SAN can coexist.

Further, in the NAS head 100, a domain 1(10A) is connected to a domain 2(10B) through a LAN 20. In FIG. 1, two domains are provided, however, any number of domains may be provided.

The NAS head 100 includes a CPU 101, a memory 102, NIC (103A and 103B) and FC I/F (104A and 104B).

The CPU 101 executes a program stored in the memory 102 to execute various kinds of processes.

The memory 102 stores the program processed by the CPU 101 and data necessary for executing the program. Specifically, NAS-OS110 for providing a function as the NAS is stored.

The NAS head 100 can provide a plurality of virtual NASs (refer them to as "virtual NAS", hereinafter) by the NAS-OS 110. When the plurality of virtual NASs are provided, each domain accesses the virtual NASs respectively so that the domain can conduct as if the domain accessed the independent NAS. In the first embodiment of the present invention, the virtual NAS is provided for each of the domains. Specifically, a virtual NAS01 (VNAS01) 120A corresponds to the domain 1 (10A) and a virtual NAS02 (V-NAS02) 120B corresponds to the domain 2(10B). Each domain accesses the data stored in the storage device 200 through the virtual NAS.

In the NAS-OS 110, an LVM control part 125, a VNAS-HLUN mapping table 130 and snapshot management information 140 are included.

In the LVM control part 125, a control program and control information for providing a function as the NAS are included. The LVM control part 125 specifies a position (a chunk No) where requested data is stored in accordance with information stored in the snapshot management information 140 in order to access the data requested from the domain. A chunk means a management unit of a storage area provided by the storage device 200. The size of the chunk is determined depending on a storing medium for providing the storage area. The chunk No is an identifier for identifying each chunk.

In the VNAS-HLUN mapping table 130, the mapping of the virtual NASs and the storage areas (HLUN, Host LUN) provided by the storage device 200 is stored. HLUN is identification information for identifying the storage area externally provided by the storage device 200. Specifically, identification information of a corresponding snapshot, identification information of a volume for storing the data or the like is stored. A detail of the VNAS-HLUN mapping table 130 will be described below in FIG. 2.

In the snapshot management information 140, is stored information of a storing part of the data and showing whether or not the data is updated is stored for each Chunk as the management unit of the data storage area of the snapshot. A detail of the snapshot management information 140 will be described below ion FIG. 3.

Further, the NAS-OS 110 has a function for providing the snapshot that can be updated. The snapshot that can be updated means a snapshot capable of updating data by separately storing updated data as a difference when original data stored in the storage device 200 is updated, as described above. In the first embodiment of the present invention, a plurality of VNASs employ the same original data to store the difference corresponding to the updated data for each of the VNASs.

The NIC 103A and 103B are interfaces connected to the domains through the LAN 20. The FCI/F 104A and 104B are interfaces connected to the storage device 200 through the SAN 30.

The storage device 200 includes a microprocessor 201, a memory 202, FCI/F 204A and 204, an original data storing volume 210 and a differential data storing volume 220.

The microprocessor 201 receives an access request transmitted from the NAS head 100 to carry out various kinds of controls. The memory 202 temporarily stores the data read and written in the storage area provided by the storage device 200. Further, the memory 202 stores programs for executing the various kinds of controls by the microprocessor 201. The FCI/F 204A and 204B are interfaces connected to the NAS head 100 through the SAN 30.

The original data storing volume 210 and the differential data storing volume 220 are used to provide the snapshot that can be updated. The original data storing volume 210 is a volume in which the original data is stored. The differential data storing volume 220 is a volume in which the updated data is stored when the data stored in the snapshot that can be updated is updated. That is, in an ordinary process, the data stored in the original data storing volume 210 is not updated and the updated data is stored in the differential data storing volume 220.

The FCI/F 204A and 204B of the storage device 200 are identified by HLUN (Host Logical Unit No). Further, the original data storing volume 210 and the differential data storing volume 220 are respectively identified by LUN (Logical Unit No). A command that is transmitted to designate the HLUN from the NAS head 100 is analyzed by the microprocessor 210. The microprocessor 201 specifies a volume and an address to be accessed on the basis of information including the HLUN and a logical block address (LBA) included in the received command to carry out a requested process.

FIG. 2 is a diagram showing one example of the VNAS-HLUN mapping table 130 of the first embodiment of the present invention.

In the VNAS-HLUN mapping table 130, as described above, the coordination of the VNASs and the storage areas (volumes) provided by the storage device 200 is stored.

The VNAS-HLUN mapping table 130 includes a VNAS-ID 131, a kind of table 132, an original data storing volume HLUN 133, a differential data storing volume HLUM 134 and a Snapshot-No 135.

The VNAS-ID 131 is an identifier that exclusively identifies the VNAS provided by the NAS head 100.

The kind of table 132 is information showing whether or not the snapshot corresponding to the VNAS is a snapshot that can be updated. When the snapshot is a snapshot that can be updated, "Virtual-LU" is set that indicates a virtual LU virtually forming one LU(Logical Unit) by the original data storing volume and the differential data storing volume. When the snapshot is not a snapshot that can be updated, "Physical-LU" is set that shows a real LU corresponding only to the original data storing volume. When the "Physical-LU" is set, a snapshot only for reading to which only the original data storing volume 210 is allocated may be employed or an ordinary LU may be allocated thereto.

As one example, a case that files forming an NAS-OS (VNAS-OS) for controlling the VNASs respectively are stored in the LU will be described below. When the "Virtual LU" is set in the kind of table 132, data such as a command file that can be shared respectively by the VNASs is stored in the original data storing volume 210 and data such as environment setting information that can be set for each of the VNASs is stored in the differential data storing volume 220. On the other hand, when the "Physical-LU" is set in the kind of table 132, all the files forming the VNAS-OS are stored independently of other VNASs. In this case, to store a file to be updated such as an update log, not the snapshot, but the ordinary LU is allocated thereto.

The original data storing volume HLUN 133 is the LUN (Logical Unit Number) for identifying the original data storing volume 210. The differential data storing volume HLUN 134 is the LUN for identifying the differential data storing volume 220.

The Snapshot-No 135 is an identifier of a snapshot corresponding to the VNAS identified by the VNAS-ID 131.

FIG. 3 is a diagram showing one example of the snapshot management information 140 of the first embodiment of the present invention.

The snapshot management information 140 includes a snapshot management table 150, a table arrangement map 160, an update bit map 170 and a storing flag 180.

In the snapshot management table 150, a stored position of the data that is actually referred to in each of the snapshots is stored for each of the chunks of the original data storing volume 210.

In the snapshot management table 150, information corresponding respectively to the snapshots specified by a Snapshot-No 151 is stored for each chunk-No 152. The information corresponding to the snapshots includes CoW (Copy On Write) request information 153, an update state bit 154 and mapping information 155.

The CoW request information 153 is information showing whether the data stored in a corresponding chunk is stored in the original data storing volume 210 or the differential data storing volume 220. When the data stored in the corresponding chunk is stored in the original data storing volume 210, "Need-Cow" is set. When the data stored in the corresponding chunk is stored in the differential data storing volume 220, "CoW-Through" is set.

In the update state bit 154, when a delay updating process is carried out during the adoption or deletion of the snapshot, is stored information as to whether or not the data stored in the corresponding chunk is being updated. When the data is being updated, "Busy" is set. When the process is not carried out, "Idle" is set.

In the mapping information 155, when the data stored in the corresponding chunk is stored in the differential data storing volume 220, an address (chunk-No) of the differential data storing volume 220 is stored. Accordingly, when in the CoW request information 153, "CoW-Through" is set, a value is set. When "Need-CoW" is set in the Cow request information 153, since the data is not updated, the data designated in the original data storing volume 210 is referred to and NULL is set in the mapping information 155.

In the table arrangement map 160, the address of the real LU in which the snapshot management information 140 is stored is stored. The snapshot management information 140 is stored in the memory 102 during the operation of the system, however, when the system is stopped, the snapshot management information 140 is backed up to the real LU. Thus, when the system is activated, the table arrangement map 160 is referred to read the snap shot management information 140 to the memory 102.

When the system is rebooted during the adoption of the snapshot, the update bit map 170 records the update state of the data to assure the consistency of the updating process of the data.

The storing flag 180 is a flag for designating the storing part of the data that is requested to be updated from the domain. In the storing flag 180, "original data" or "differential data" is set. When the "original data" is set in the storing flag 180, the updated data is stored in the original data storing volume 210. When the "differential data" is set, the updated data is stored in the differential data storing volume 220. In the first embodiment of the present invention, the storing flag 180 is switched, so that the plurality of snapshots that are pointed to the same original data storing volume 210 and can be updated can be individually updated or updated together.

The structure of the computer system of the first embodiment of the present invention is described above. Now, a detail of the process of the first embodiment of the present invention will be described below. Initially, an ordinary updating process will be described by referring to FIGS. 4 to 6.

Figure 4:
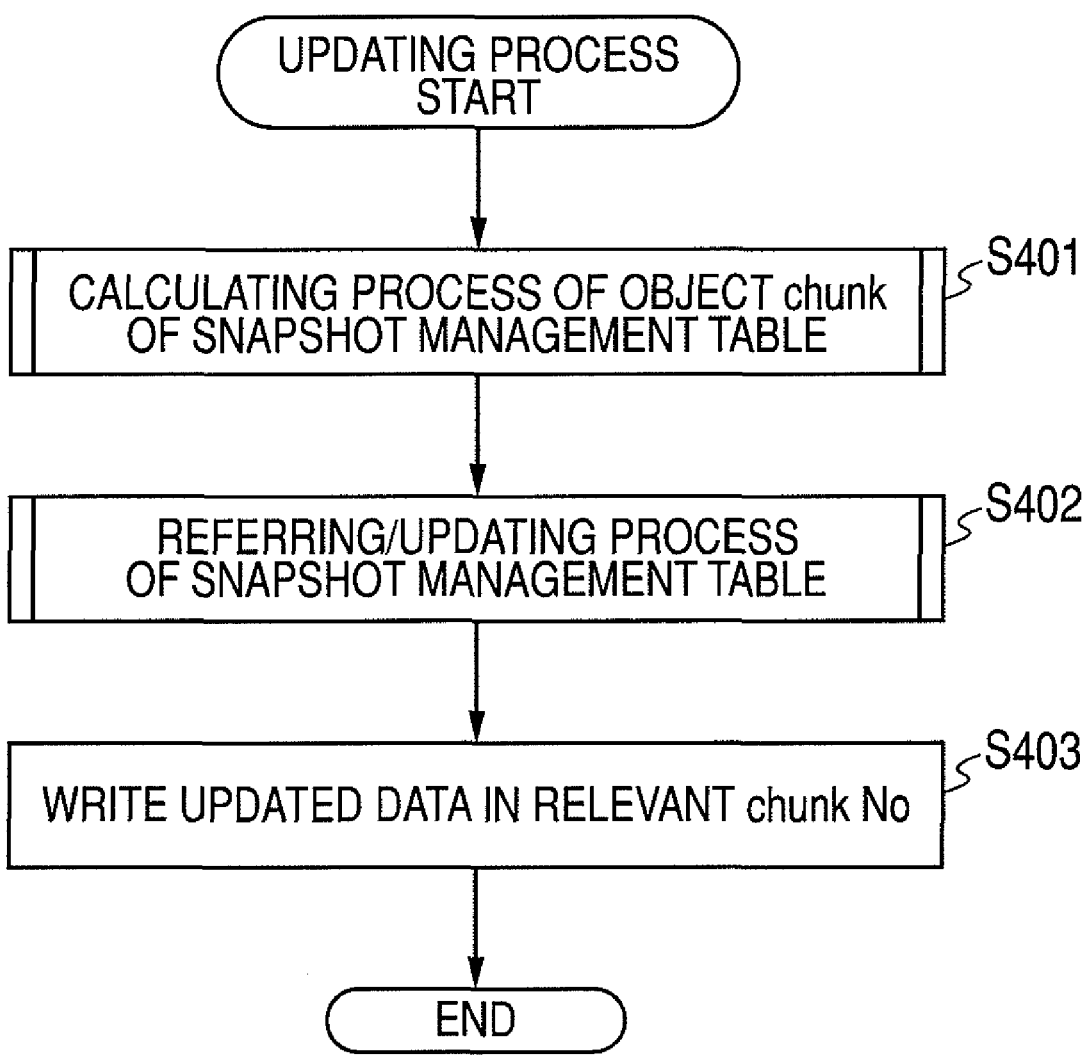
FIG. 4 is a flowchart showing a procedure of an updating process to a snapshot of the first embodiment of the present invention.

FIG. 4 is a flowchart showing the procedure of the updating process of the snapshot in the first embodiment of the present invention.

When the CPU 101 of the NAS head 100 receives a data update request for the VNAS 120A from the domain 10A (or the VNAS 120B from the domain 10B), the CPU 101 carries out a calculating process of an object chunk of the snapshot management table to obtain a storing area (the object chunk) of the updated data included in the update request (S401). A detail of the calculating process of the object chunk of the snapshot management table will be described below in FIG. 5.

The CPU 101 of the NAS head 100 carries out a referring/updating process of the snapshot management table to refer to or update the information of the object chunk obtained by the calculating process of the object chunk of the snapshot management table in S401 in accordance with the process requested from the domain (S402). A detail of the referring/updating process of the snapshot management table will be described below in FIG. 6.

Finally, the CPU 101 of the NAS head 100 writes the updated data in the object chunk specified by the processes of S401 and S402 (S403).

Figure 5:
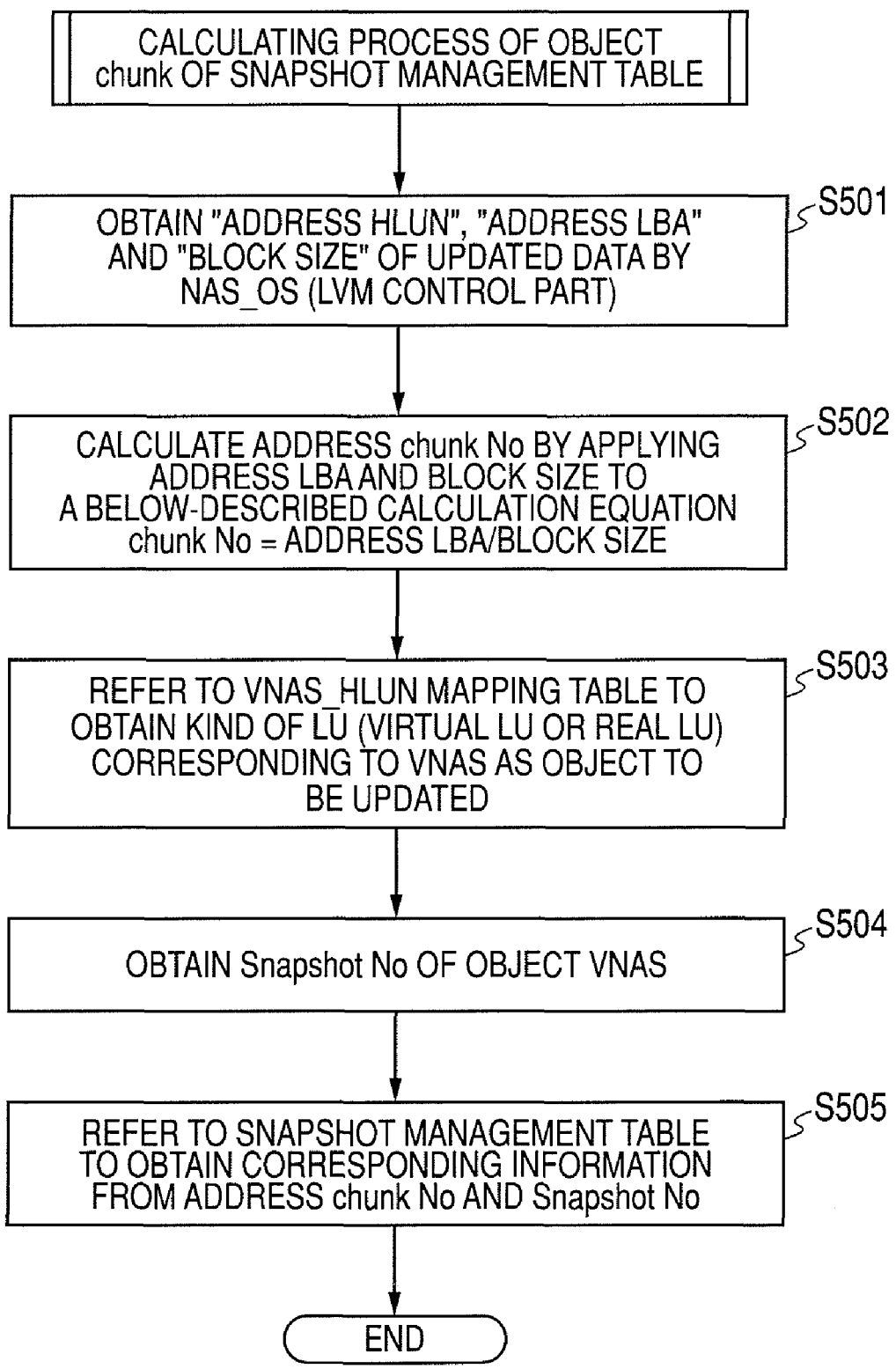
FIG. 5 is a flowchart showing a procedure of an object chunk calculating process of a snapshot management table of the first embodiment of the present invention.

FIG. 5 is a flowchart showing in detail the procedure of the calculating process (S401 in FIG. 4) of the object chunk of the snapshot management table in the first embodiment of the present invention.

In the calculating process of the object chunk of the snapshot management table, the object chunk is specified in the original data storing volume 210 in accordance with the update request transmitted from the domain. Further, corresponding information is obtained from the snapshot management table 150. Now, the processes will be specifically described below.

The CPU 101 of the NAS head 100 obtains an "address HLUN", an "address LBA" and a "block size" included in the update request received from the domain by the LVM control part 125 of the NAS-OS 110 (S501). The address HLUN is the LUN for identifying a volume in which the data as an object to be updated is stored. The address LBA is a logical address of the volume specified by the address HLUN. The block size is the size of a block in which the data is read and written.

The CPU 101 of the NAS head 100 calculates an address chunk No on the basis of the address LBA and the block size obtained in the process of S501 (S502). The address chunk No is identification information of an area where the data as an object to be updated is stored. Specifically, the address chunk-No is calculated by the address LBA/block size.

The CPU 101 of the NAS head 100 refers to the VNAS-HLUN mapping table 130 to obtain a corresponding kind of LU from the kind of table 132 of a record that the identification information of the VNAS which receives the update request corresponds to the VNAS-ID 131 (S503).

When the LU corresponding to the VNAS receiving the update request is the real LU or when the "original data" is set in the storing flag 180, the CPU 101 may store the updated data in accordance with the address chunk-No calculated in the process of S502. On the other hand, when the LU corresponding to the VNAS receiving the update request is the virtual LU, and the "differential data" is set in the storing flag 180, the CPU 101 needs to refer to the snapshot management table 150 and specify an area where the updated data is actually stored.

The CPU 101 of the NAS head 100 refers to the VNAS-HLUN mapping table 130 to obtain the identification information (Snapshot-No 135) of a corresponding snapshot in accordance with the identification information of the VNAS receiving the update request (S504).

Further, the CPU 101 of the NAS head 100 obtains corresponding information from the snapshot management table 150 on the basis of the address chunk No obtained in the process of S502 and the Snapshot-No 135 obtained in the process of S504 (S505).

Figure 6:
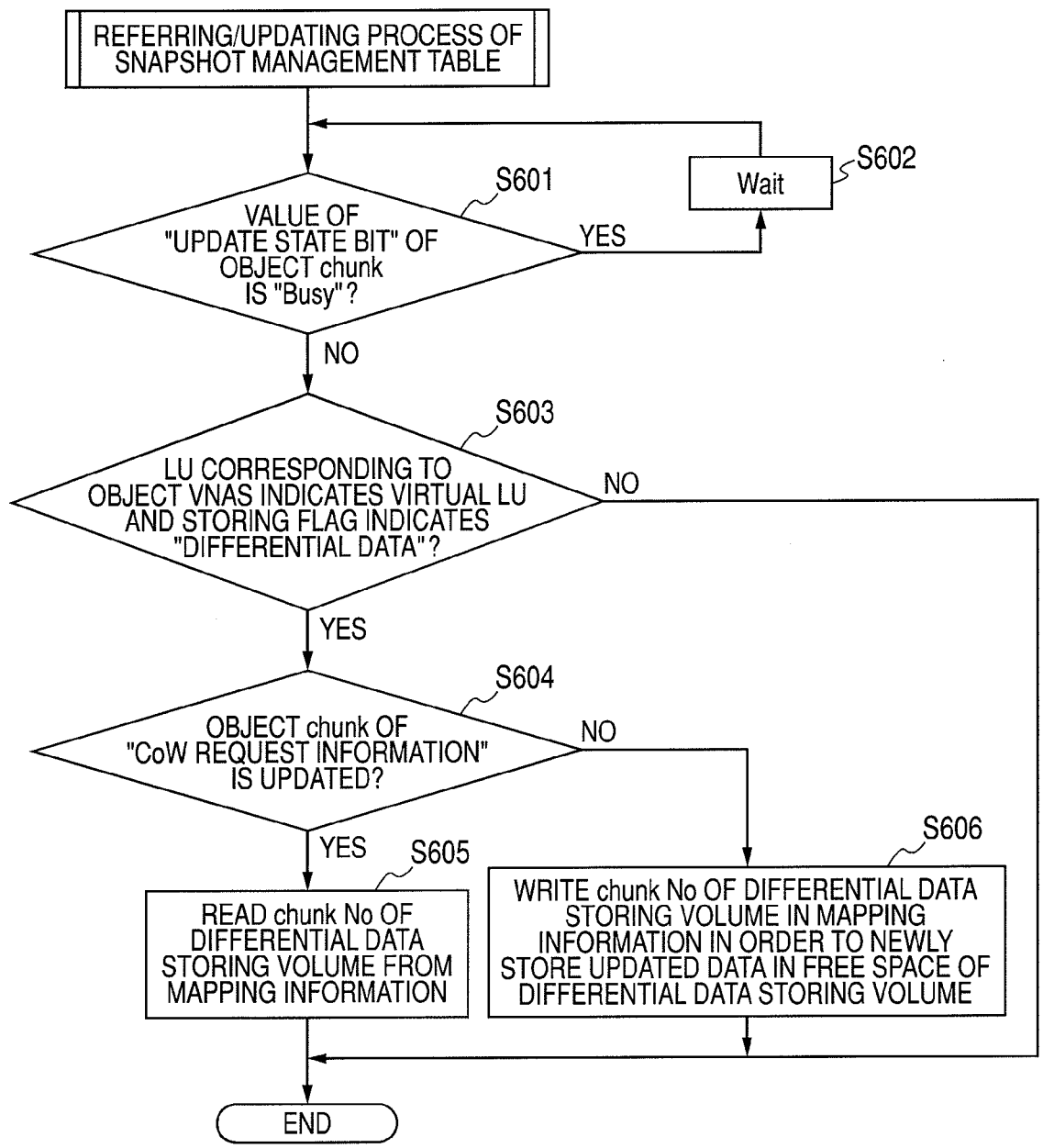
FIG. 6 is a flowchart showing a procedure of a referring/updating process of the snapshot management table of the first embodiment of the present invention.

FIG. 6 is a flowchart showing in detail the procedure of the referring/updating process of the snapshot management table (S402 shown in FIG. 4) in the first embodiment of the present invention.

In the referring/updating process of the snapshot management table, when the storing part of the updated data is being updated, the CPU 101 waits until the updating process is completed. Further, when the updated data is stored in the virtual LU, the CPU 101 specifies the chunk of the differential data storing volume 220 as the storing part.

The CPU 101 of the NAS head 100 decides whether or not the value of the update state bit 154 of the object chunk obtained in the calculating process of the object chunk of the snapshot management table indicates "Busy" (S601). When the value of the update state bit 154 indicates "Busy" (a result of S601 is "Yes"), the CPU 101 waits until the updating process is finished (S602).

Then, the CPU 101 of the NAS head 100 decides whether or not the LU corresponding to the VNAS as an object is the virtual LU and whether or not the "differential data" is set in the storing flag (S603). That is, the CPU 101 decides whether or not the storing part of the updated data is the differential data storing volume 220. When the storing part of the updated data is not the differential data storing volume 220 (a result of S603 is "No"), since the CPU 101 may update the data stored in the object chunk obtained in the calculating process of the object chunk of the snapshot management table, the CPU 101 finishes the process.

When the differential data storing volume 220 is an object to be updated (a result of S603 is "Yes"), the CPU 101 of the NAS head 100 refers to the CoW request information 153 to decide whether or not the object chunk is updated (S604). When the object chunk is updated, since the updated data is stored in the differential data storing volume 220, the "Cow-Through" is set in the CoW request information 153. On the other hand, when the object chunk is not updated, since the data stored in the original data storing volume 220 is referred to, the "Need-CoW" is set in the CoW request information 153.

When the object chunk is updated (a result of S604 is "Yes"), the CPU 101 of the NAS head 100 refers to the mapping information 155 to obtain a chunk No for identifying the chunk of the differential data storing volume 220 (S605). On the other hand, when the object chunk is not updated (a result of S604 is "No"), the CPU 101 of the NAS head 100 specifies an area for newly storing the updated data in the differential data storing volume 220 to write a chunk No corresponding to the area in the mapping information 155 (S606). At this time, a value of the CoW request information 153 is updated from the "Need-CoW" to the "CoW-Through".

When the CPU 101 of the NAS head 100 finishes the referring/updating process of the snapshot management table, the CPU 101 of the NAS head 100 writes the updated data in the chunk specified in the above-described processes in the process of S403 of FIG. 4 to finish this process.

In the updating process described above, when the storing flag 180 is previously set by a user, and the virtual LU is set to the snapshot requested to be updated, the data is updated on the basis of the value of the set storing flag 180. That is, an area where the updated data is stored is arbitrarily changed depending on the contents updated by the user. For instance, in the system employed in a plurality of environments, when information such as master information commonly used thereby is updated, the above-described method is employed. Information updated and added individually by the systems respectively is stored in the area of the differential data storing volume 220 allocated to each of the VNASs.

Further, the version up or update of the VNAS-OS executed for each VNAS provided in the computer system of the first embodiment of the present invention will be described below. As described above, since the command file of the VNAS-OS can be used commonly by the VNASs respectively, the command file is stored in the original data storing volume 210. On the other hand, since a log file is information held for each VNAS, the log file is stored in the differential data storing volume 220.

Figure 7:
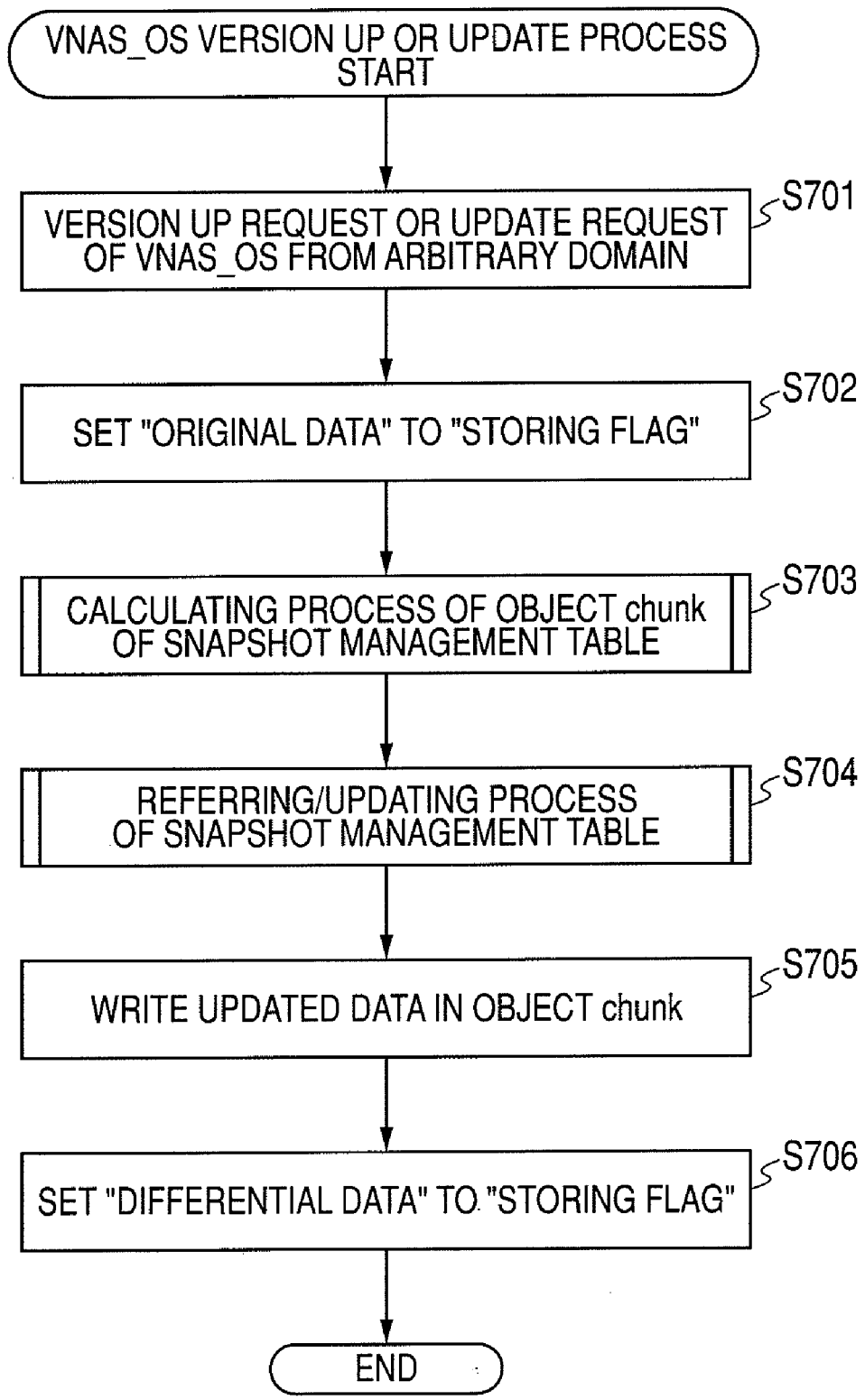
FIG. 7 is a flowchart showing a procedure for updating VNAS-OS of the first embodiment of the present invention.

FIG. 7 is a flowchart showing a procedure for updating the VNAS-OS of the first embodiment of the present invention.

The CPU 101 of the NAS head 100 receives a version up request or an update request of the VNAS-OS from an arbitrary domain (S701). When a management terminal is included in the computer system, the CPU 101 of the NAS head 100 may receive the version up request or the update request of the VNAS-OS from the management terminal. Here, the version up or the update of the VNAS-OS is carried out for all the VNASs provided by the NAS head 100. Further, the updated data necessary for the version up or the update of the VNAS-OS at the time of receiving the version up request of the VNAS-OS is supposed to be already received by the NAS head 100.

When the CPU 101 of the NAS head 100 receives the version up request of the VNAS-OS, the CPU 101 of the NAS head 100 sets the "original data" to the storing flag 180 (S702). As described above, when the "original data" is set to the storing flag 180, an object of the files forming each VNAS-OS that is to be updated can be switched to the original data storing volume 210 from the differential data storing volume 220.

The CPU 101 of the NAS head 100 carries out the calculating process of the object chunk of the snapshot management table (S703) to specify the object chunk for storing the updated data.

The calculating process of the object chunk of the snapshot management table has the same procedure as the procedure described in FIG. 5.

The CPU 101 of the NAS head 100 carries out the referring/updating process of the snapshot management table (S704). The referring/updating process of the snapshot management table has the same procedure as the procedure described in FIG. 6.

The CPU 101 of the NAS head 100 writes the updated data in the object chunk specified in the calculating process of the object chunk of the snapshot management table (S705). When the CPU 101 of the NAS head 100 finishes the writing operation of the updated data, the CPU 101 of the NAS head 100 sets the "differential data" to the storing flag 180 (S706) and changes the storing part of the updated data to the differential data storing volume 220.

As described above, at the time of the version up or update of the VNAS-OS, the "original data" is set to the storing flag for the storing parts of the files forming the VNAS-OS, so that the version up or update of the OS of the VNASs can be respectively realized at the same time. Further, since setting files set respectively in the VNASs and the log files are held in the differential data storing volume 220 as they are, a customized environment can be maintained.

Further, in the NAS head 100 of the first embodiment of the present invention, a procedure for adding the VNAS and a procedure for the version up or update of the OS of the VNAS that is operating will be described by referring to examples of screens. Before the examples of the screens are explained, a VNAS group as the assembly of the VNASs that use the common original data storing volume 210 will be initially described below.

Figure 8:
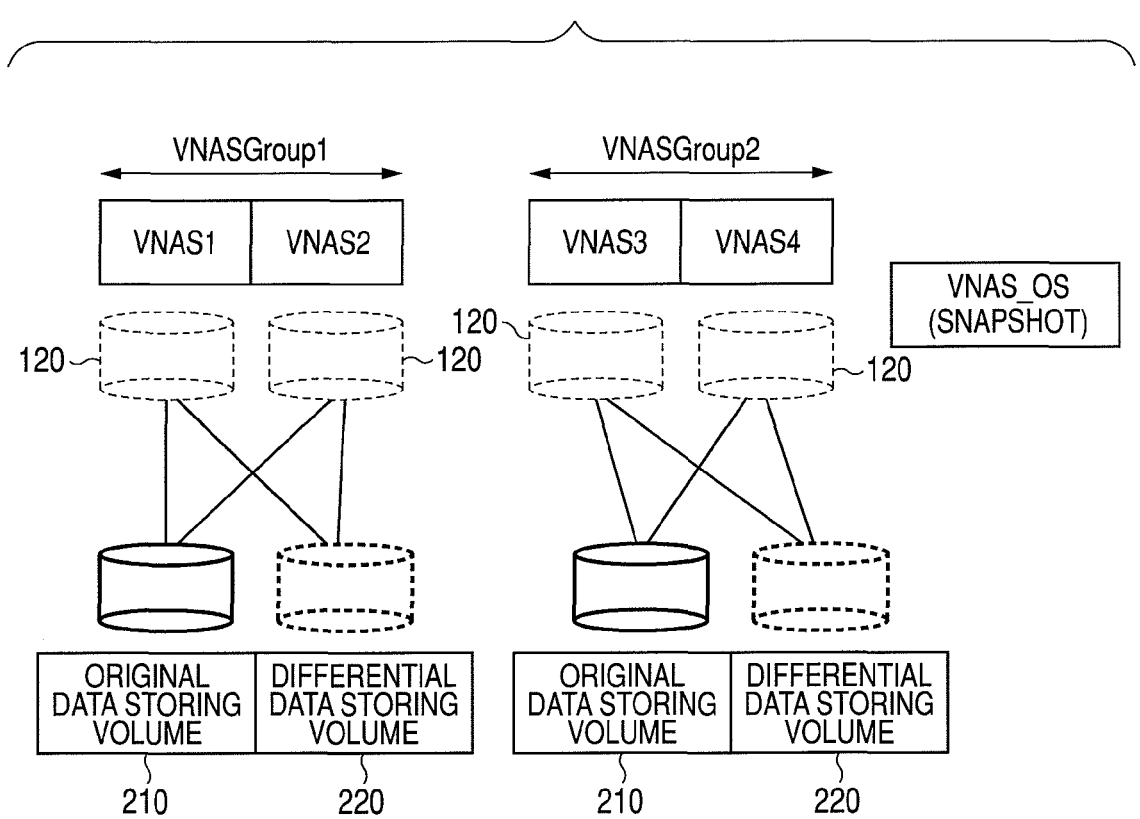
FIG. 8 is a diagram for explaining a virtual NAS group of the first embodiment of the present invention.

FIG. 8 is a diagram for explaining the VNAS group of the first embodiment of the present invention.

In the first embodiment of the present invention, the VNAS-OS operates for each VNAS. At this time, a file such as the command file that can be used commonly by the VNASs respectively among the files necessary for operating the VNAS-OS is stored in the original data storing volume 210. Further, data such as the log file that is held in each VNAS is stored in the differential data storing volume 220. In such a way, the VNASs in which the VNAS-OSs are respectively operated by the configuration file stored in the same original data storing volume 210 are called a "virtual NAS group".

In the first embodiment of the present invention, one original data storing volume 210 and one differential data storing volume 220 correspond to the one virtual NAS group. Further, in the differential data storing volume 220, data respectively peculiar to the VNASs is stored, however, each VNAS may have the differential data storing volume 220. Further, a plurality of original data storing volumes 210 may be allowed to correspond to the one virtual NAS group.

Subsequently, a procedure for requesting for adding the VNAS to the NAS head 100 will be described by referring to examples of screens.

Figure 9:
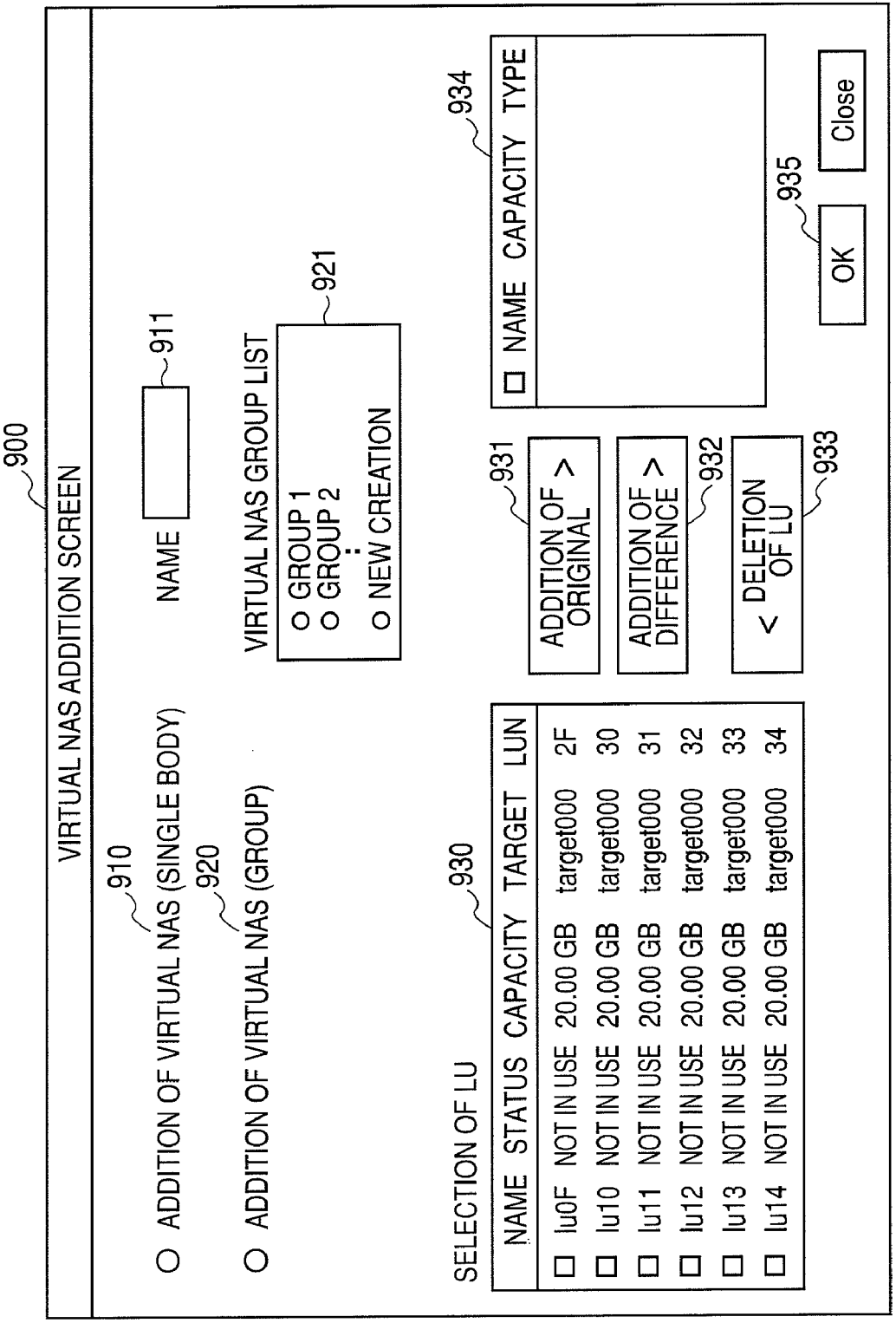
FIG. 9 is a diagram showing one example of a virtual NAS addition screen for adding a virtual NAS of the first embodiment of the present invention.

FIG. 9 is a diagram showing one example of a VNAS addition screen 900 for adding the VNAS in the first embodiment of the present invention.

In the VNAS addition screen 900 shown in FIG. 9, a function for adding a single VNAS and a function for adding the virtual NAS group can be carried out.

When the single VNAS is added, a VNAS addition (a single body) 910 is firstly selected, and further, required information is inputted in an input column 911.

On the other hand, when the virtual NAS group is newly created, or when a VNAS is newly added to the existing virtual NAS group, a VNAS addition (group) 920 is initially selected. The virtual NAS group to be added is selected from a new creation of the virtual NAS group or a virtual NAS group list 921.

When the existing virtual NAS group is selected, the original data storing volume 210 and the differential data storing volume 220 corresponding to the selected virtual NAS group are allocated to the newly added VNAS.

When the virtual NAS group is newly created, an LU corresponding to the original data storing volume 210 and an LU corresponding to the differential data storing volume 220 are selected from an LU selection column 930. When the LU corresponding to the original data storing volume 210 is selected, an original data storing volume addition button 931 is operated. Further, when the LU corresponding to the differential data storing volume 220 is selected, a differential data storing volume addition button 932 is operated. The selected original data storing volume and the differential data storing volume are added to a selected LU list 934. Further, when the selected LU is cancelled, the LU included in the selected LU list 934 is selected and an LU deletion button 933 is operated.

When all necessary items are completely inputted to operate an OK button 935, a virtual NAS group recognizing screen is displayed. A detail of a VNAS added group recognizing screen will be described below by referring to FIG. 10.

When the contents of the virtual NAS group to which the VNAS is newly added are recognized, the addition process of the VNAS is carried out to display a screen for informing of the completion of the addition of the virtual NAS group. A detail of the screen for informing of the completion of the addition of the virtual NAS group will be described below by referring to FIG. 11.

FIG. 10 is a diagram showing one example of the VNAS added group recognizing screen in the first embodiment of the present invention.

In the VNAS added group recognizing screen, are displayed a list of the VNASs included in the virtual NAS group to which the VNAS is added and identification information of the LUs corresponding to the original data storing volume 210 and the differential data storing volume 220 that are allocated to the virtual NAS group.

When the displayed contents are correct, a manager operates an "OK" button. When the contents need to be changed, the manager operates a "Cancel" button. When the "OK" button is operated, the addition process of the VNAS is carried out as described above.

FIG. 11 is a diagram showing one example of the screen for informing of the completion of the addition of the virtual NAS group in the first embodiment of the present invention.

As described above, when the "OK" button of the VNAS added group recognizing screen is operated, the addition process of the VNAS is carried out. The screen for informing of the completion of the addition of the virtual NAS group is displayed to inform that the addition process of the VNAS is completed.

Further, a procedure for improving or updating the version (version up) of the OS of the VNAS will be described below. Here, especially, a case will be described that the versions of the OSs of all the VNASs belonging to the virtual NAS group are improved or updated (version up).

Figure 12:
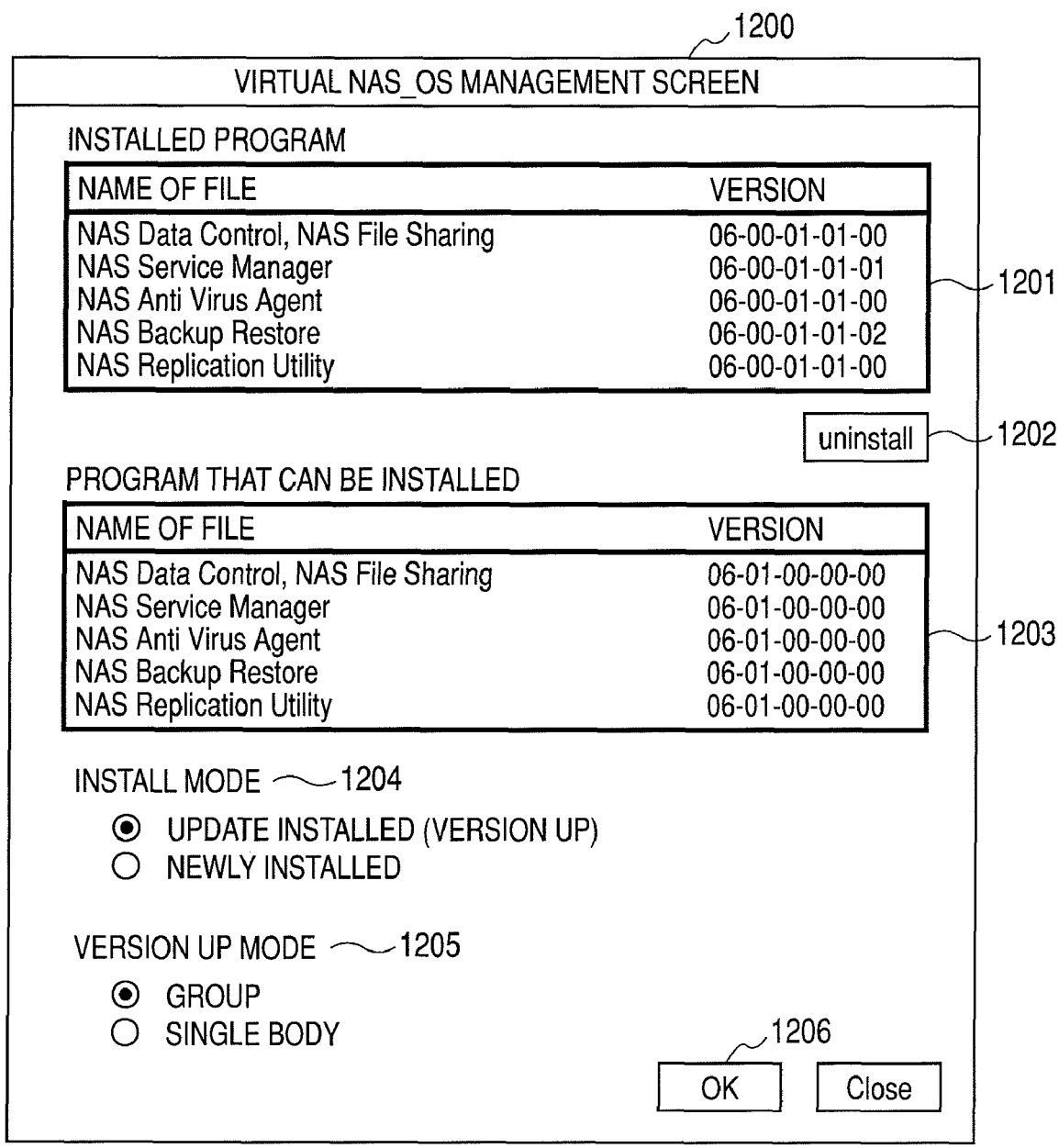
FIG. 12 is a diagram showing one example of a virtual NAS-OS management screen for managing the OS of the virtual NAS of the first embodiment of the present invention.

FIG. 12 is a diagram showing one example of a VNAS-OS management screen 1200 for managing the OS of the VNAS of the first embodiment of the present invention.

The VNAS-OS management screen 1200 includes a function for newly installing a file (program) related to the OS or a function for uninstalling the installed file. Further, the VNAS-OS management screen 1200 includes a function for the version up of or updating the installed file.

The VNAS-OS management screen 1200 includes a list of installed programs 1201 and a list of programs that can be installed 1203.

In the list of installed programs 1201, the programs installed in the VNAS are stored. Files shown in the list of installed programs 1201 are programs for executing processes. A setting file is created or set in a setting screen (a separate screen) for each VNAS after the program is installed.

The installed file can be deleted by operating an uninstall button 1202 after the file is selected.

In the list of programs that can be installed 1203, the list of the files that can be newly installed in the VNAS is displayed. Files displayed in the list of programs that can be installed 1203 indicate files whose programs are newer in their versions than the installed programs or files of programs that are not installed.

An install mode 1204 includes an update mode that a file is installed in an existing VNAS and a new install that the OS is installed in the newly added VNAS. When the version up process of the OS of the VNAS shown in FIG. 7 is carried out, the update mode is selected.

A version up mode 1205 includes a group mode that the files are installed in all VNASs included in the virtual NAS group to which a designated VNAS belongs and a single mode that the files are installed only in the designated VNAS. When the version up process of the OS of the VNAS shown in FIG. 7 in the first embodiment of the present invention is carried out, the group mode is selected.

In the single mode, the files to be installed are stored in the differential data storing volume 220. On the other hand, in the group mode, the files to be installed are stored in the original data storing volume 210, so that the files can be installed (version up) in all the VNASs included in the virtual NAS group to which the designated VNAS belong.

When an OK button 1206 is operated after values are inputted to items which need to be set in the VNAS-OS management table 1200, a recognizing screen of the VNAS as an object to be installed is displayed. A detail of the recognizing screen will be described in detail by referring to FIG. 13.

When the VNAS as an object in which the file is installed in the recognizing screen of the VNAS as an object to be installed, the installation of the file is started. After the installation is completed, a completion informing screen is displayed. A detail of the completion informing screen will be described below by referring to FIG. 14.

Figures 13, 14:
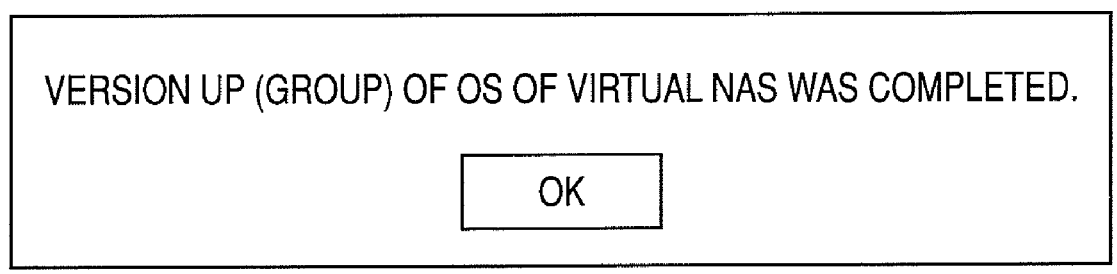
FIG. 13 is a diagram showing one example of a recognizing screen during a version up of the OS of the virtual NAS of the first embodiment of the present invention.
FIG. 14 is a diagram showing one example of a screen for informing about the completion of the version up of the OS of the virtual NAS of the first embodiment of the present invention.

FIG. 13 is a diagram showing one example of the recognizing screen at the time of the version up or update of the OS of the VNAS in the first embodiment of the present invention.

On an installation recognizing screen, in the case of the group mode, are displayed the list of the VNASs included in the virtual NAS group to which the VNAS as an object to be installed is added and the identification information of the LUs corresponding to the original data storing volume 210 and the differential data storing volume 220 that are allocated to the virtual NAS group. On the other hand, in the case of the single mode, only the name of the VNAS is displayed.

When the displayed contents are correct, a manager operates an "OK" button. When the contents need to be changed, the manager operates a "Cancel" button. When the "OK" button is operated, the installation of the file is started. Specifically, the version up or update process of the OS of the VNAS shown in FIG. 7 is carried out.

FIG. 14 is a diagram showing one example of a screen for informing about the completion of the version up of the OS of the VNAS in the first embodiment of the present invention.

As described above, when the "OK" button on the installation recognizing screen is operated, the installation of a selected file is carried out. The installation completion informing screen is displayed to inform that the installation of the file is completed.

The procedure of the version up of or updating the VNAS-OSs operating respectively in the plurality of VNASs together is described above.

The example for the version-up of or updating the OS of the VNAS is described by referring to FIG. 12. Further, for instance, when the files are stored, a screen for switching the storing flag 180 may be displayed to individually change the storing parts of the files. Further, the screen for switching the storing flag 180 can be realized by adding a check box for switching the storing flag 180 to the screen for storing the files. When the NAS head 100 receives an instruction to change the storing part of the updated data, the NAS head 100 sets the storing flag 180 in accordance with a request. In such a way, the storing flag 180 may be set in accordance with the request from the domain.

Further, in the first embodiment of the present invention, the NAS head 100 is separated from the storage device 200, however, the present invention may be applied to the NAS having the NAS head 100 formed integrally with the storage device 200. In this case, a table for managing the mapping of the VNASs and the volumes (LUN) may be used in place of the VNAS-HLUN mapping table 130 for storing the mapping of the VNASs and the HLUN.

According to the first embodiment of the present invention, the user can easily switch whether the data is to be updated together in the plurality of VNASs or the data is to be updated individually for each VNAS. Accordingly, the data shared by all the VNASs can be updated together without updating the data for each VNAS.

Further, when the updated data is individually stored for each VNAS, the updated data needs to be held for each VNAS. However, according to the first embodiment of the present invention, the data stored in the shared volume is updated so that a storage capacity necessary for holding the updated data can be reduced.

According to the first embodiment of the present invention, since the difference at the time of updating the shared data is held as it is, the contents changed before the update process can be held as they are for each VNAS.

According to the first embodiment of the present invention, since the version up processes or the update processes of the OSs can be carried out together, a time necessary for the version up of the OSs can be reduced to decrease a working cost. Further, as described above, the differential data changed from the original data is held as it is, a customized environmental setting can be kept intact.

Second Embodiment

In the first embodiment of the present invention, the NAS head 100 switches the storing part of the updated data. However, in a second embodiment, a storage device 200 individually switches a storing part of updated data.

In the second embodiment, contents common to those of the first embodiment will be suitably omitted.

Figure 15:
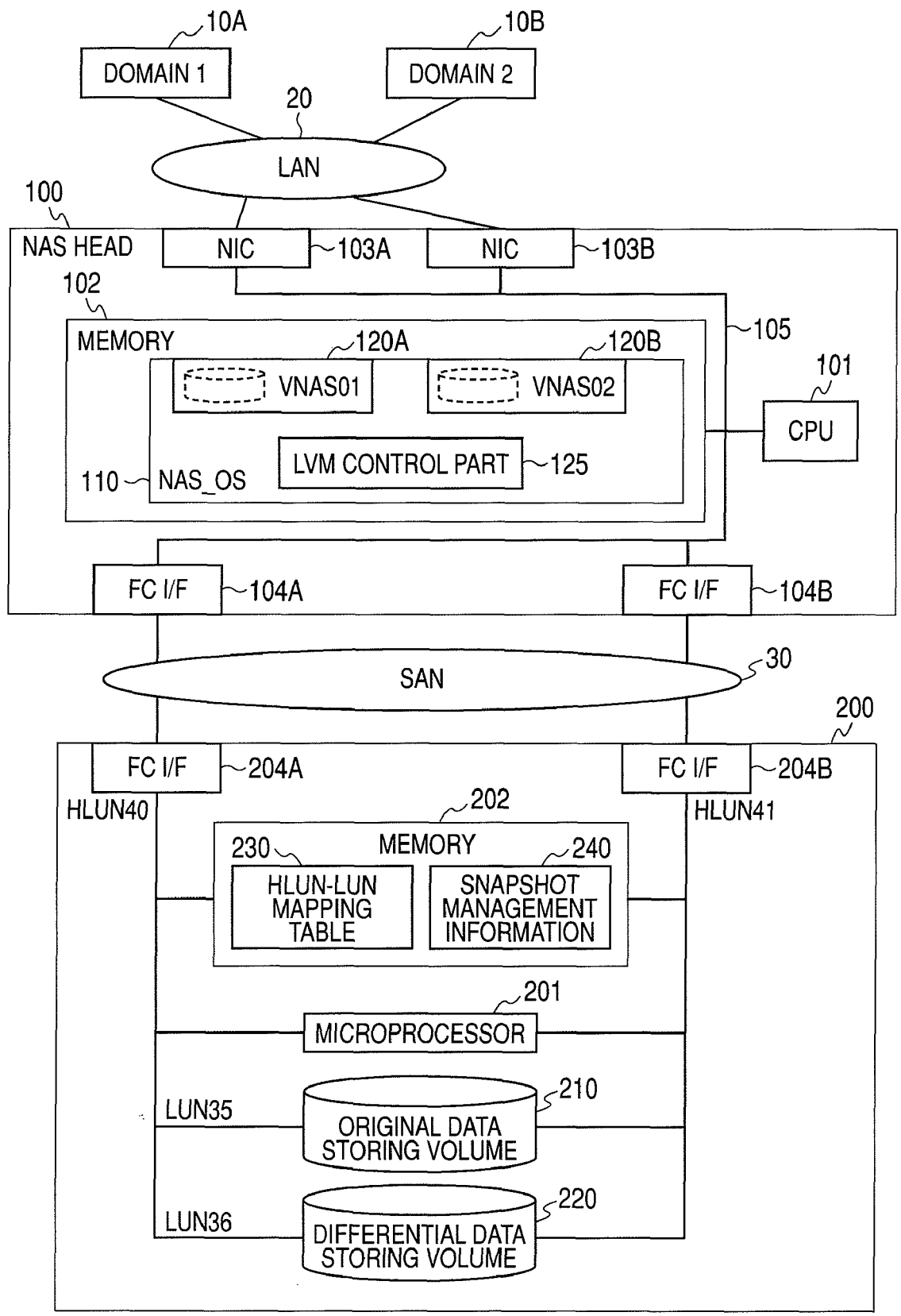
FIG. 15 is a diagram showing the structure of a computer system of a second embodiment of the present invention.

FIG. 15 is a diagram showing the structured of a computer system of the second embodiment of the present invention.

The computer system of the second embodiment of the present invention includes a NAS head 100 and a storage device 200 as in the first embodiment.

In the second embodiment of the present invention, as described above, the storage device 200 has a function for individually switching the storing part of the updated data. Accordingly, since a VNAS-HLUN mapping table 130 and snapshot management information 140 are not required in the NAS head 100, a NAS head mounted by a related art can be used.

On the other hand, in the storage device 200, an HLUN-LUN mapping table 230 and snapshot management information 240 necessary for switching the storing part of the updated data are provided. Further, the storage device 200 has a function for providing a snapshot that can be updated. Other structures are the same as those of the first embodiment.

The HLUN-LUN mapping table 230 maps an HLUN corresponding to an FCI/F 204 of the storage device 200 to an original data mapping table 210 and a differential data storing volume 220. A detail of the HLUN-LUN mapping table 230 will be described below by referring to FIG. 17.

The structure of the snapshot management information 240 is the same as that of the snapshot management information 140 of the first embodiment.

Figure 16:
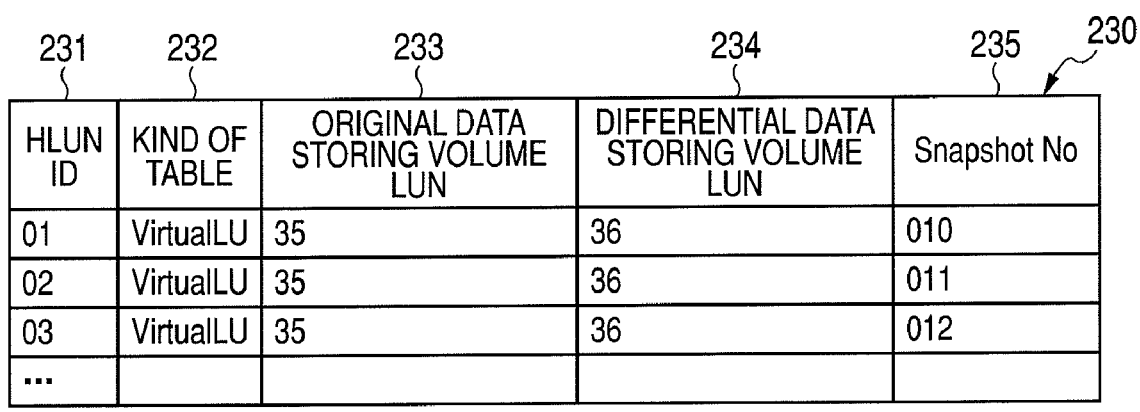
FIG. 16 is a diagram showing one example of an HLUN-LUN mapping table of the second embodiment of the present invention.

FIG. 16 is a diagram showing one example of the HLUN-LUN mapping table 230 of the second embodiment of the present invention.

In the HLUN-LUN mapping table 230, the mapping of the HLUN and the original data storing volume 210 and the differential data storing volume 220 is stored as described above. A relation between a VNAS and the HLUN, which is information necessary for mounting an ordinary VNAS, is stored in the NAS head 100.

The HLUN-LUN mapping table 230 includes an HLUN-ID 231, a kind of table 232, an original data storing volume LUN 233, a differential data storing volume LUN 234 and a Snapshot-No 235.

The HLUN-ID 231 is an identifier for exclusively identifying a host LUN recognized by the NAS head 100.

The kind of table 232 is information showing whether a snapshot corresponding to the HLUN-ID 231 is allocated to a virtual LU or to a real LU as in the kind of table 132 of the first embodiment. In the case of the virtual LU, "Vertical-LU" is set. In the case of the real LU, "Physical-LU" is set.

The original data storing volume LUN 233 is an LUN for identifying the original data storing volume 210. The differential data storing volume LUN 234 is an LUN for identifying the differential data storing volume 220.

The Snapshot-No 235 is an identifier of a snapshot corresponding to the HLUN identified by the HLUN-ID 231.

Figure 17:
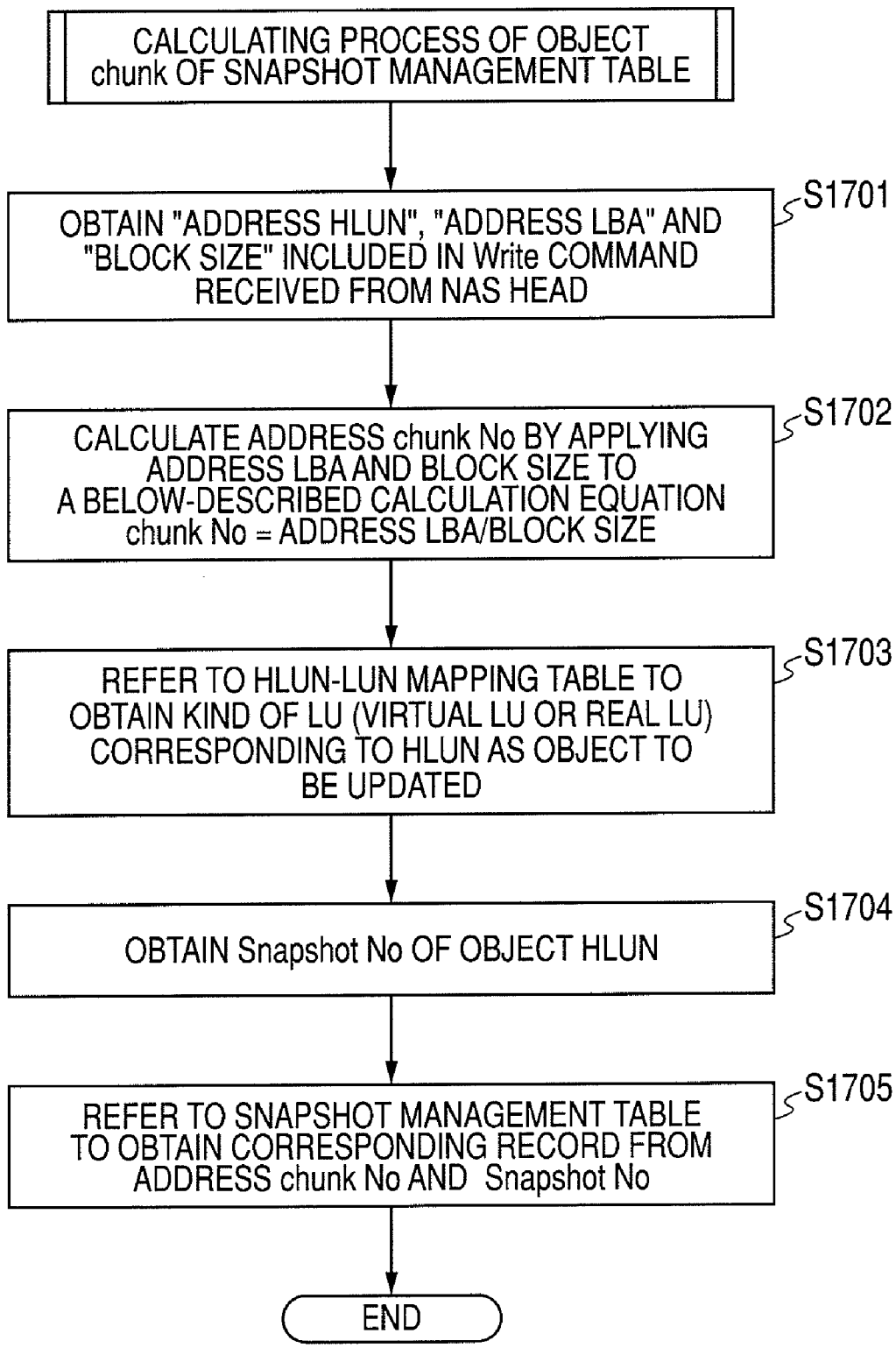
FIG. 17 is a flowchart showing a procedure of an object chunk calculating process of a snapshot management table of the second embodiment of the present invention.

FIG. 17 is a flowchart showing a procedure of a calculating process of an object chunk of a snapshot management table of the second embodiment of the present invention.

In the calculating process of the object chunk of the snapshot management table, the object chunk is specified in accordance with information included in a Write command received from the NAS head 100. The object chunk calculating process is basically the same as the procedure of the first embodiment shown in FIG. 5. Now, the process will be specifically described below.

When a microprocessor 201 of the storage device 200 receives the Write command from the NAS head 100, the microprocessor 201 obtains an "address HLUN", an "address LBA" and a "block size" included in the received Write command (S1701). The "address HLUN", the "address LBA" and the "block size" are the same as those of the first embodiment.

The microprocessor 201 of the storage device 200 calculates an address chunk No on the basis of the address LBA and the block size obtained in the process of S1701 (S1702). A calculating method is the same as that of the first embodiment.

The microprocessor 201 of the storage device 200 refers to the HLUN-LUN mapping table 230 to obtain a corresponding kind of LU from the kind of table 232 of a record in which the identification information of the HLUN receiving a request for update corresponds to the HLUN ID 231 (S1703).

The microprocessor 201 of the storage device 200 refers to the HLUN-LUN mapping table 230 to obtain the identification information (Snapshot-No 235) of a corresponding snapshot in accordance with the identification information of a VNAS receiving a request for update (S1704).

Further, the microprocessor 201 of the storage device 200 obtains a corresponding record from a snapshot management table 150 in accordance with the values of the address chunk-No obtained in the process of S1702 and the Snapshot-No 235 obtained in the process of S1704 (S1705).

In a procedure for the version up or update of the OS of the VNAS, a main operation is changed to the microprocessor 201 of the storage device 200 from the CPU 101 of the NAS head 100. However, the basic procedure of processes is the same as that of the first embodiment.

According to the second embodiment of the present invention, the NAS head 100 having a function for providing the VNASs is combined with the storage device 200 of the second embodiment of the present invention, so that the same effects as those of the first embodiment can be obtained.

Further, in the second embodiment of the present invention, the storage device 200 includes the function for switching the storing part of the updated data. Accordingly, when the storage device 200 has a function for providing the snapshots, the effects of the present invention can be realized without requiring the NAS head 100.

What is claimed is:

1. A computer system comprising:
   a computer that provides a plurality of virtual storage areas for reading and writing data; and
   a storage device;
   the computer including:
     a first interface coupled to the storage device;
     a first processor coupled to the first interface; and
   a first memory coupled to the first processor;
   the storage device including:
     a second interface coupled to the computer;
     a second processor coupled to the second interface, and providing an original data volume that stores original data shared by the virtual storage areas, and a differential data volume that stores differential data of each of the virtual storage areas from the original data, to the computer, and
     a second memory connected to the second processor,
   wherein the first memory stores storage area management information that manages to provide the virtual storage areas by using the original data volume and the differential data volume, and a storing flag that sets the original data volume or the differential data volume as an update data destination,
     wherein when the first processor receives an update request to one of the virtual storage area and the storing flag is set to the original data volume, the first processor specifies a first area of the original data volume, the first area corresponding to the one of the virtual storage area, to update data stored in the specified first area,
     wherein when the first processor receives the update request and the storing flag is set to the differential data volume, the first processor determines whether or not a second area corresponding to the first area is allocated to the differential data volume in accordance with the storage area management information,
     when the second area is allocated to the differential data volume, the first processor updates data stored in the second area,
     when the second area is not allocated to the differential data volume, the first processor newly allocates the second area to the differential data volume to store data requested by the update request.

2. A computer system according to claim 1, wherein the first processor receives the read of the data stored in the original data volume, the first processor specifies a third area for storing the data as an object to be read and decides whether or not a fourth area corresponding to the third area is allocated to the differential data volume in accordance with the storage area management information, and when the fourth area is allocated to the differential data volume, the first processor provides the stored data to the fourth area.

3. A computer system according to claim 1, wherein the storage area management information includes: information showing whether or not corresponding areas exist in the differential data volume respectively for areas obtained by dividing the original data volume by a prescribed size, and information showing the positions of the areas when the corresponding areas exist in the differential data volume.

4. A computer system according to claim 1, wherein the computer includes an operating system having a controller that manages the virtual storage areas respectively and a file system, and the first processor executes the operating system for each of the virtual storage areas.

5. A computer system according to claim 4, wherein in the original data volume and the differential data volume, files that execute the operating systems are stored and the first processor sets the storing flag to the original data volume to update the operating systems together.

6. A data updating method effected in a computer system having a computer and a storage device, where the computer provides a plurality of virtual storage areas for reading and writing data;
   the computer including:
     a first interface coupled to the storage device;
     a first processor coupled to the first interface; and
     a first memory coupled to the first processor;
   the storage device including:
     a second interface coupled to the computer;
     a second processor coupled to the second interface, and providing an original data volume that stores original data shared by the virtual storage areas, and a differential data volume that stores differential data of each of the virtual storage areas from the original data, to the computer, and
     a second memory connected to the second processor, the data updating method comprising:
   storing, in the first memory: storage area management information that manages to provide the virtual storage areas by using the original data volume and the differential data volume, and a storing flag that sets the original data volume or the differential data volume as an update data destination,
     wherein when the first processor receives an update request to one of the virtual storage area and the storing flag is set to the original data volume, the first processor specifies a first area of the original data volume, the first area corresponding to the one of the virtual storage area, to update data stored in the specified first area,
     wherein when the first processor receives the update request and the storing flag is set to the differential data volume, the first processor determines whether or not a second area corresponding to the first area is allocated to the differential data volume in accordance with the storage area management information,
     when the second area is allocated to the differential data volume, the first processor updates data stored in the second area,
     when the second area is not allocated to the differential data volume, the first processor newly allocates the second area to the differential data volume to store data requested by the update request.

7. A data updating method according to claim 6, wherein the first processor receives the read of the data stored in the original data volume, the first processor specifies a third area for storing the data as an object to be read and decides whether or not a fourth area corresponding to the third area is allocated to the differential data volume in accordance with the storage area management information, and when the fourth area is allocated to the differential data volume, the first processor provides the stored data to the fourth area.

8. A data updating method according to claim 6, wherein the storage area management information includes: information showing whether or not corresponding areas exist in the differential data volume respectively for areas obtained by dividing the original data volume by a prescribed size, and information showing the positions of the areas when the corresponding areas exist in the differential data volume.

9. A data updating method according to claim 6, wherein the computer includes an operating system having a controller that manages the virtual storage areas respectively and a file system, and the first processor executes the operating system for each of the virtual storage areas.

10. A data updating method according to claim 9, wherein in the original data volume and the differential data volume, files that execute the operating systems are stored and the first processor sets the storing flag to the original data volume to update the operating systems together.

11. A non-transitory computer-readable medium embodying a data updating method effected in a computer system having a computer and a storage device, where the computer provides a plurality of virtual storage areas for reading and writing data;
   the computer including:
      a first interface coupled to the storage device;
      a first processor coupled to the first interface; and
      a first memory coupled to the first processor;
   the storage device including:
      a second interface coupled to the computer;
      a second processor coupled to the second interface, and providing an original data volume that stores original data shared by the virtual storage areas, and a differential data volume that stores differential data of each of the virtual storage areas from the original data, to the computer, and
      a second memory connected to the second processor, the data updating method comprising:
   storing, in the first memory: storage area management information that manages to provide the virtual storage areas by using the original data volume and the differential data volume, and a storing flag that sets the original data volume or the differential data volume as an update data destination,
      wherein when the first processor receives an update request to one of the virtual storage area and the storing flag is set to the original data volume, the first processor specifies a first area of the original data volume, the first area corresponding to the one of the virtual storage area, to update data stored in the specified first area,
      wherein when the first processor receives the update request and the storing flag is set to the differential data volume, the first processor determines whether or not a second area corresponding to the first area is allocated to the differential data volume in accordance with the storage area management information,
      when the second area is allocated to the differential data volume, the first processor updates data stored in the second area,
      when the second area is not allocated to the differential data volume, the first processor newly allocates the second area to the differential data volume to store data requested by the update request.

12. A non-transitory computer-readable medium according to claim 11, wherein the first processor receives the read of the data stored in the original data volume, the first processor specifies a third area for storing the data as an object to be read and decides whether or not a fourth area corresponding to the third area is allocated to the differential data volume in accordance with the storage area management information, and when the fourth area is allocated to the differential data volume, the first processor provides the stored data to the fourth area.

13. A non-transitory computer-readable medium according to claim 11, wherein the storage area management information includes: information showing whether or not corresponding areas exist in the differential data volume respectively for areas obtained by dividing the original data volume by a prescribed size, and information showing the positions of the areas when the corresponding areas exist in the differential data volume.

14. A non-transitory computer-readable medium according to claim 11, wherein the computer includes an operating system having a controller that manages the virtual storage areas respectively and a file system, and the first processor executes the operating system for each of the virtual storage areas.

15. A non-transitory computer-readable medium according to claim 14, wherein in the original data volume and the differential data volume, files that execute the operating systems are stored and the first processor sets the storing flag to the original data volume to update the operating systems together.

* * * * *